Oct. 26, 1943.  F. P. WILLIAMS ET AL  2,333,064
METHOD AND APPARATUS FOR FORM MILLING RESINOUS BLANKS
Filed Jan. 18, 1941
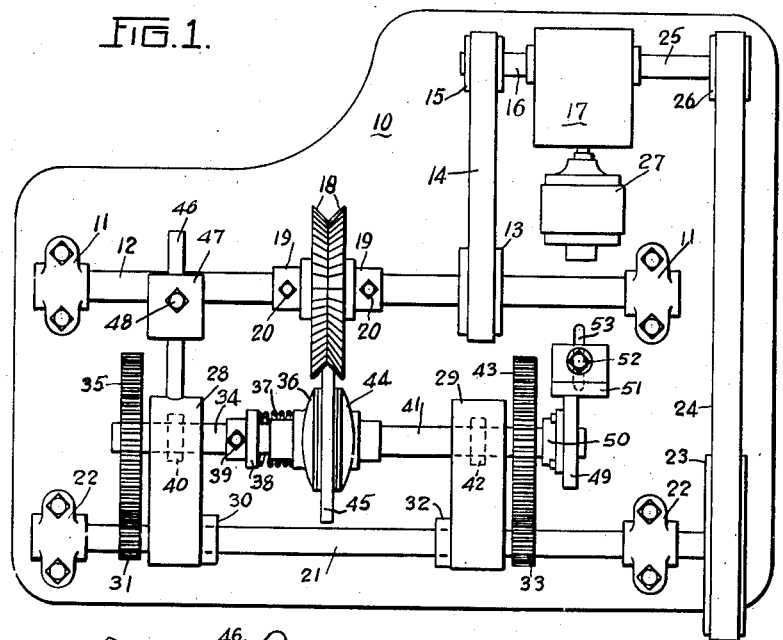
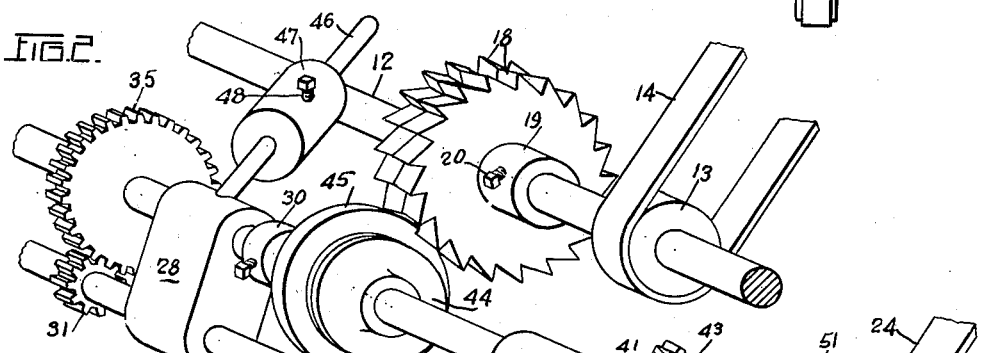
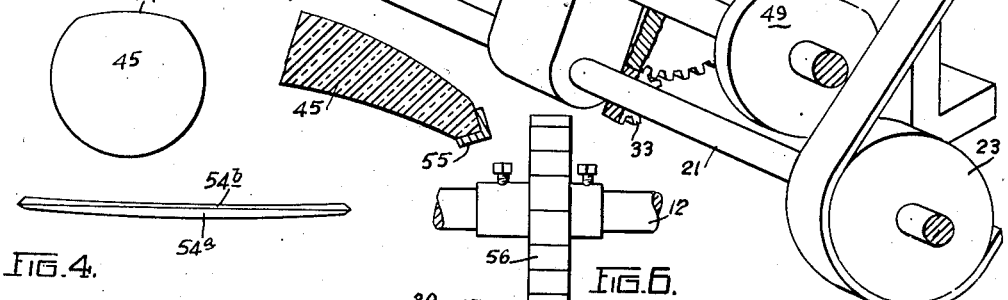
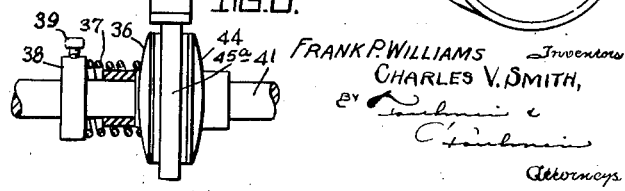

Patented Oct. 26, 1943

2,333,064

UNITED STATES PATENT OFFICE 2,333,064

METHOD AND APPARATUS FOR FORM MILLING RESINOUS BLANKS

Frank P. Williams and Charles V. Smith, Dayton, Ohio, assignors to The Univis Lens Company, Dayton, Ohio, a corporation of Ohio Application January 18, 1941, Serial No. 375,089

1 Claim. (Cl. 90—13.4)

This invention relates to a method and apparatus for shaping the edge of disk-like articles formed from plastic materials. This invention is particularly applicable for shaping disks of plastic material which are to be used as lenses, and is of special value when chamfering and shaping ophthalmic lenses.

When manufacturing lenses, or other disk-like articles which are to be fitted within a frame, it is particularly convenient, for assembling the disk-like article into a frame, if the article be chamfered in a manner that the angle of chamfer remains constant with respect the axis of the disk. Heretofore it has been the common practice when assembling disk-like articles into frames, and particularly when assembling ophthalmic lenses into metal frames, to shape the article to the desired configuration and then to chamfer the edges thereof so that the chamfer will be even over the entire edge of the article. When assembling such disk-like articles it has been necessary to deform the frames to agree with the curvature of the edges of the disk-like article. This is particularly true when placing ophthalmic lenses in frames since these lenses many times have prisms formed therein, or have a cylinder imposed upon a sphere to obtain the proper lens correction desired. Thus, when manufacturing such lenses the configuration of the edge of the disk-like article or lens varies considerably and if the chamfer of the edge of the article remains constant around the edge thereof, it can readily be seen that the frame which surrounds the lens will be required to be deformed to an extent which will agree with the configuration of the edge of the lens. This form of practice requires individual manipulation of the frame to a particular lens, and thus entails considerable handwork and skill to properly assemble an ophthalmic lens in a metal frame.

This invention has been developed to remove these former disadvantages and to simplify the manner in which the lens can be shaped and the edges thereof chamfered. As is well known, ophthalmic lenses heretofore produced have always been made of optical glass and thus have required intricate and complicated devices for grinding the edge configuration of the lens and for chamfering the edges thereof. The applicant, by this invention, eliminates the necessity for complicated edge shaping and chamfering devices since the applicants form the lens from a synthetic plastic material, such as the organic resins produced by the polymerization of the monomeric derivatives of acrylic and methacrylic acids. The substances which have properties suitable for optical purposes, such examples as Crystalite, Lucite, and Plexiglas, are known to those versed in the art of lens manufacturing. Articles made from the artificial resins can be shaped and cut more easily than the articles made from glass, hence it is an object of this invention to provide a method and apparatus wherein ordinary milling cutters are used to shape and chamfer a disk of plastic material.

It is another object of the invention to provide an apparatus wherein a disk of plastic material is rotated slowly with respect a milling cutter, and in engagement therewith, so that the periphery of a plastic disk can be shaped by a single revolution thereof.

It is another object of the invention to rotate a milling cutter in engagement with the edge of a disk of plastic material to shape the same, the degree of engagement being controlled by a form pattern.

It is another object of the invention to chamfer the edge of a disk-like article of plastic material concomitant with shaping the article to its final outline shape.

It is still another object of the invention to chamfer the edge of an irregularly shaped disk-like member formed of plastic material in a manner that the chamfer angle remains constant with respect the axis of rotation of the disk.

It is still another object of the invention to chamfer both edges of an irregularly shaped disk-like article formed of plastic material so that the angles of chamfer remain constant with respect the axis of rotation of the disk, and thus form the sides of a triangle the apex ring of which, formed around the edge of the disk, lies in a plane.

It is another object of the invention to chamfer the edge of an ophthalmic lens so that the angles of chamfer are inclined toward an apex, the apex ring formed by the continuous chamfer on the edge of the lens lying in a plane.

It is still another object of the invention to provide an improved and simplified apparatus for performing the aforementioned objects.

It is another object of the invention to provide a method for shaping an ophthalmic lens which completes the shaping upon a single revolution of the lens with respect the shaping tool.

It is still a further object of the invention to provide a method for shaping an ophthalmic lens in accordance with foregoing object wherein the edges of the lens are chamfered concomitantly with the shaping operation.

It is another object of the invention to shape an ophthalmic lens formed from a plastic resinous material by cutting the edge thereof with an ordinary milling cutter, and chamfering the edge by the same means.

It is a further object of the invention to shape an ophthalmic lens formed from plastic resinous material, and to chamfer the edge of the same so that it can be assembled into a metal frame without deformation of the frame.

Further objects and advantages will become apparent from the drawing and a reading of the description.

In the drawing:

Figure 1 is a plan view of a machine for performing the operation of this invention.

Figure 2 is a perspective elevational view of a portion of the machine disclosed in Figure 1.

Figure 3 is a face view of a lens or disk-like article formed on the machine.

Figure 4 is an edge view of the disk-like article or lens shown in Figure 3, and shows the manner in which the apex of the chamfered edge lies in a plane.

Figure 5 is a partial cross-sectional view of a lens mounted within a frame.

Figure 6 is an elevational view of the cutting mechanism for shaping the outline of a disk-like article, and shows a modified arrangement which performs the shaping operation.

This invention relates particularly to apparatus which is used in the manufacture of lenses from synthetic plastic resins. While the invention will be particularly described with respect the shaping of the outline of lenses, and the chamfering of the edges thereof, it will be understood that the invention is just as applicable to the shaping and chamfering of any disk-like article which is formed from a synthetic plastic material.

The invention has particular merit with regard the edging and chamfering of ophthalmic lenses. It is well known that ophthalmic lenses have different shapes, thicknesses and various curvatures according to whether a prism, cylinder, or sphere, or a combination of these configurations is imposed upon the lens to secure the proper correction. It is also common to shape the perimeter of the lens in some odd configuration in order to enhance the appearance of the lens. Since the lens has both a surface curvature and an odd perimeter configuration it has previously been necessary to use complicated machinery to both shape the perimeter of the lens and chamfer the same. The common practice has heretofore been to chamfer both edges of the lens to a like degree and to oscillate the lens while chamfering the same in order to retain the lens in proper relation with the chamfering and grinding wheels in order to produce a chamfer which has an even area around the entire edge of the lens.

This has required that metal frames, which are many times used around the lens to support the same, be formed by hand or by proper manipulation of tools to form the frame to the configuration of the lens. This has required considerable manual manipulation of frames and has entailed considerable expansion.

In this invention the applicant is setting forth a method and an apparatus which eliminates the previous expensive practices and considerably simplifies the manner in which the periphery of the lens can be shaped and chamfered.

Since the applicants are producing lenses from synthetic plastic materials he can use milling cutters for shaping the lens and chamfering the same, which cutters have heretofore been impossible of use when shaping or forming lenses of glass.

The machine disclosed herein is somewhat diagrammatic in its construction, however all of the essential features required to perform the shaping and chamfering operations are included in the disclosure, it being readily understood that the mechanism can take various forms, and that various mechanical alterations can be made in the apparatus without departing from the spirit or scope of the invention.

The apparatus consists of the base 10 upon which bearing members 11 are securely positioned. A shaft 12 is journaled in the bearings 11 and is provided with a pulley 13 over which a belt 14 extends. The belt 14 cooperates with the pulley 15 which is mounted on a shaft 16 extending from the gear box 17. A pair of milling cutters 18 is mounted upon the shaft 12 and have hub extensions 19 which are secured to the shaft 12 by means of the set screws 20. In the apparatus disclosed in this invention, it is proposed that two milling cutters 18 of like angular face configuration shall be placed in engagement with each other so that a V-shaped milling groove is provided. The cutters 18 are adjustable axially upon the shaft 12 since the set screws 20 can readily be loosened to permit shifting of the cutters along the shaft 12.

A second shaft 21 is arranged parallel with respect the shaft 12 and is journaled in the bearings 22 which are suitably secured to the base 10. The shaft 21 carries a pulley 23 over which the belt 24 extends. The gear box 17 is provided with a second extending shaft 25 upon the end of which there is provided the pulley 26 over which the belt 24 extends.

An electric motor 27 has the driving shaft thereof extending into the gear box 17 and is in suitably geared connection with the shafts 16 and 25. The internal mechanism of the gear box 17 is so arranged that the shaft 16 will rotate at a higher speed than the shaft 25, whereby the shaft 12 will be rotated at a higher speed than the shaft 21.

A pair of pivot blocks 28 and 29 is carried upon the shaft 21 in a manner that they can freely rotate thereon. The pivot block 28 is prevented from axial movement along the shaft 21 by means of the collar 30 and the hub of the gear 31, which gear is properly secured to the shaft 21. The pivot block 29 is similarly secured from axial movement along the shaft 21 by means of the collar 32 and the hub of the gear 33.

The pivot block 28 has a shaft 34 journaled therein, upon one end of which there is fixedly positioned the gear 35 which is in engagement with the gear 31. The opposite end of the shaft 34 carries a friction shoe 36 which is slidably mounted upon the shaft 34 and is retained from complete removal from the shaft 34 by a suitable fastening means on the end thereof. A compression spring member 37 surrounds the shaft 34 and is positioned between the friction shoe 36 and a collar 38 which is secured to the shaft 34 by means of the set screw 39.

The shaft 34 is prevented from axial movement within the pivot block 28 by means of a suitably enlarged collar 40 arranged within the pivot block 28 and suitably fastened to the shaft 34.

The pivot block 29 carries a shaft 41 journaled therein which is prevented from axial movement within the pivot block 29 by means of the collar 42 positioned within the pivot block and suitably secured to the shaft 41. One end of the shaft 41 carries a gear 43 which is in mesh with the gear 33 on the shaft 21. The opposite end of the shaft 41 carries a friction shoe 44 which is fixedly mounted upon the shaft 41.

The shafts 34 and 41 are thus driven from the shaft 21 through the gears 31, 35, 33 and 43, which gears are arranged to drive the shafts 34 and 41 at the same speed so that a disk 45 positioned between the friction shoes 36 and 44 will be rotated. The spring 37 moves the friction shoe 36 in a rightward direction to cause frictional engagement of the disk 45 with the shoe 44 whereby the disk 45 is retained by spring pressure in position between the shoes 36 and 44 so that the shafts 34 and 41 can rotate the same at a proper speed with respect the milling cutters 18.

To retain the disk 45 in engagement with the milling cutters 18 the pivot block 28 is provided with an extending arm 46 upon which there is a weight 47. The weight 47 is secured upon the arm by means of a set screw 48. As heretofore mentioned the pivot blocks 28 and 29 are suitably pivoted upon the shaft 21 so that the weight 47, which is eccentric with respect to the vertical axis of the shaft 21, will rotate the pivot blocks 28 and 29 in a manner to cause the disk 45 to engage the milling cutters 18. The degree of pressure by which the disk 45 engages the milling cutters 18 can be controlled by the positioning of the weight 47 along the rod 46.

To control the degree of engagement of the disk 45 with the milling cutters 18 a form pattern is carried upon the shaft 41 and is provided with a hub 50 which is detachably secured to the shaft 41 so that form patterns of different peripheral configurations can be placed upon the shaft 41. An angle plate 51 is positioned adjacent the form pattern 49 and against which the form pattern 49 will be urged by means of the weight 47 pivoting the pivot blocks 28 and 29 about the shaft 21.

It may now readily be seen that when a form pattern of a particular peripheral configuration is placed upon the shaft 41, and the shaft 41 is suitably rotated while the disk 45 is held in engagement with the milling cutters 18, which are also rotated, that axial rotation of the disk 45 will cause the milling cutters 18 to remove material from the peripheral edge of the disk 45 in a manner that the form pattern 49 will be reproduced upon the disk 45. The speed of rotation of the milling cutters 18 is considerably higher than the speed of rotation of the disk 45. In fact, the disk 45 is adapted to be rotated once and upon completion of rotation the milling cutters 18 will have removed all of the excess material from the edge of the disk 45 so that the form pattern 49 will be reproduced upon the disk.

Such a high speed and rapid removal of material from the disk 45 is possible since the disk 45 is made from a synthetic plastic material, which material can be worked with the same machine tools as can work wood or metal, and can be worked in the same manner and at substantially the same high speeds of working.

The angle plate 51 is adjustable upon the base 10 by means of the bolt 52 extending through the slot 53 provided in the base 10. Movement of the angle plate 51 with respect the shaft 21 permits the pivot blocks 28 and 29 to rotate about the shaft 21 in a manner to carry the shafts 34 and 41 into closer relation with the milling cutters 18 so that form patterns of different sizes can be positioned on the shaft 41 to produce disks of different diameters, but will have produced thereon the same peripheral configuration as the form pattern 49.

While the apparatus herein discloses a gravity weight 47 which retains the form pattern 49 against the angle plate 51 and the disk 45 against the milling cutters 18, it can readily be seen that other means can be used for urging these elements in cooperating working relation.

Such other means would readily be a spring, or some type of air pressure control, or any other means for urging rotation of the pivot blocks 28 and 29 about the shaft 21.

The machine as heretofore described has been disclosed as an apparatus for forming the peripheral outline upon a disk or blank of resinous material 45. This blank 45 can be either a plain flat disk or can be an ophthalmic lens, or any other disk of resinous material upon which a particular outline is to be reproduced.

The apparatus is also capable of performing the function of chamfering the edges of the disk, which chamfering can be performed either after the shaping operation or concomitantly with the shaping operation. If the chamfering is to be done after the shaping operation then the first operation will be the shaping of the disk 45 by means of a flat milling cutter, as disclosed in Figure 6, and the chamfering operation will then be performed with a V-shaped milling cutter disclosed in Figure 1. However, both operations can be conveniently carried out at the same time by the use of the V-shaped milling cutters disclosed in Figure 1.

To chamfer the edge of the disk 45, the substantial median point of the edge of the disk is positioned in alignment with the apex of the V provided by the milling cutters 18. As heretofore stated, the friction shoe 44 is fixed upon the shaft 41 so that the pressure of engagement of the shoe 36 upon the disk 45 will retain the same in proper axial position with respect the milling cutters 18 and the V-shaped cutting faces formed thereby.

If the resinous disk 45 is merely a flat disk element the rotation of the disk by means of the shaft 41 will permit the milling cutters 18 to cut or shape the edge of the disk 45 in a manner to produce a triangular shaped edge surface thereon, whereby the apex ring formed by the angular shape of the edge will lie in a plane. Under these circumstances the apex of the edge surface will be concentric with respect the axis of the disk, if the disk is a true circle. The angle of chamfer remains constant with respect the axis of rotation of the disk.

When a disk having an odd configuration, such as that of the form pattern 49, is shaped and chamfered it may be seen that when the form pattern 49 is retained against the angle plate 51 that the periphery configuration of the resinous disk 45 will be cut in a manner to conform therewith. Since the milling cutters 18 provide a V-shaped edge cut for the disk 45, the edge of the disk will be chamfered as heretofore described. However, the apex of the chamfered edge of the disk will not be concentric with the axis thereof but will be maintained as a continuous straight line around the edge of the disk 45. These flat disks 45, commonly known as planos can be used for safety goggles, sun-glasses, and other articles not requiring lens curvature. It is thus seen that since the chamfered edge of the disk is arranged in a manner that the apex of the chamfer lies in a plane, that the disk can be placed in a frame without deformation of the frame.

When shaping a disk of resinous material which has a curved face, such as a disk for an ophthalmic lens, or a plano which has a curved surface, and which is to be imparted with an odd configuration, such as the form pattern 49, it can be seen that the edge of the resinous disk will not always maintain a position at right angles to the axis of rotation of the disk. Such an article of manufacture is represented by Figures 3, 4 and 5, wherein the resinous disk 45 is provided with a flattened edge contour as indicated at 54. This resinous disk 45 is also provided with a surface curvature, as shown in Figures 4 and 5. The disk 45 can either be a plano or can be an ophthalmic lens, the problem of chamfering of the edge of the lens for fitting the same within a frame being a common problem.

When shaping and chamfering the edge of such a resinous disk, the disk 45 is positioned between the friction shoes 36 and 44 as previously described, and the disk is retained in engagement with the milling cutters 18 by means of the weight 47 pivoting the pivot blocks 28 and 29 about the shaft 21. The form pattern 49, which is to be reproduced upon the disk 45, is placed upon the end of the shaft 41 and retained in engagement with the angle plate 51 in a manner heretofore described. The shafts 12 and 21 are rotated by means of the driving gear box 17, driven by the motor 27, so that the milling cutters 18 are rotated at a relatively high speed while the resinous blank 45 is rotated at a very low speed with respect the milling cutters 18. In fact, it is the purpose of the invention to remove all of the excess of the edge material of the disk 45 by means of the milling cutters 18 upon one complete revolution of the disk 45, whereby the edge contour will be imparted to the disk as well as a predetermined shape.

It can readily be seen that rotation of the disk 45, while in continuous engagement with the milling cutters 18, and under controlled engagement by the form pattern 49 will reproduce the form pattern upon the resinous disk 45.

Since, as heretofore mentioned, the disk 45 has a curved surface thereto, or can have a prism or cylinder imparted upon the curved surface of the disk to produce an ophthalmic lens, it may be seen that while the disk is rotated upon its axis that the edge thereof will not always maintain a right angular relation with the axis. This changing angular relation of the edge of the disk with respect the milling cutter 18 will alter the degree of the cut removed from the edges of the disk 45 as it is rotated in engagement with the milling cutters.

As shown in Figure 4, a greater quantity of material will be removed from the edge surface 54a than from the edge surface 54b when the edge 54 is brought into engaging relation with the milling cutters. The remaining portion of the edge surface of the disk 45 will have substantially the same amount of material removed from both of the edge surfaces. However, since the disk 45 cannot be displaced axially with respect the milling cutters 18 they will produce an edge surface on the disk having substantially a triangular shape wherein the apex of the V-shaped ring will lie in a plane, even though the movement of the edge surface of the disk changes its angular relation with respect the milling cutters. This is accomplished since the cutting faces of the milling cutters 18 maintain a fixed angular relation with respect the axis of rotation of the resinous disk 45 so that regardless of the contour of the periphery to be reproduced upon the edge of the disk 45 the V-shaped edge will be a continuous straight line around the edge surface.

Such a chamfering of the edge surface of the resinous disk 45 permits the disk to be placed in a V-shaped metal frame 55, as disclosed in Figure 5, the frame being previously pre-formed to the proper peripheral contour but having the V-shaped-retaining edge thereof arranged in a plane. It may thus be seen that the resinous disk, or ophthalmic lens 45 can thus be easily assembled within the frame 55 without requiring hand manipulation of the frame to fit the particular requirements of the lens being positioned therein.

The apparatus herein described thus provides a machine and a method for shaping the periphery of a resinous disk of material, which can be either a common flat disk or an ophthalmic lens in a manner that the material can be readily worked and shaped by the use of ordinary milling cutters. The method and apparatus also provides the edge of the shaped disk with a chamfer which is shaped to permit easy assembly of the disk into a frame without manipulation of the lens frame to fit the particular lens.

As heretofore mentioned, Figure 6 discloses an apparatus by which the resinous disk 45 is provided with a peripheral contour of predetermined shape, but the edges thereof are not chamfered. In this arrangement the milling cutters 18 are replaced with a flat milling cutter 56 which is mounted upon the shaft 12 of the machine heretofore described. The resinous disk 45a is retained between the friction shoes 36 and 44 mounted upon the shaft 41 of the machine as heretofore described and is retained in engagement with the milling cutter 56 in the same manner as the disk 45 is retained in engagement with the milling cutters 18. The form pattern 49 carries the shaft 41 through the same type of motion as previously referred to in order to reproduce the contour thereof upon the resinous disk 45a. Since the milling cutter 56 has a flat cutting surface, the edge of the disk 45 will be shaped in peripheral contour only.

The apparatus herein disclosed and described simplifies the operation of shaping the contour of a blank of resinous material which is to be used as a lens, and particularly those blanks of resinous material which are to be used as ophthalmic lenses since the contour of ophthalmic lenses is changed to meet various individual requirements for purposes of appearance. While the contour of the ophthalmic lenses is changed yet it is desirable that all of the various contours can be readily assembled within frames of predetermined contour without the requirement of individual manipulation and bending of the frames to fit the particular lens requirements. Thus this invention simplifies the assembling of lenses in frames of predetermined contour, since the edge of the lens by which the same will be retained within the frame is of uniform configuration to fit any lens frame having the same contour and the same uniform configuration of edge retaining surface.

Having thus fully described our invention, what we claim as new and desire to secure by Letters Patent is:

An apparatus for shaping the edge of a disk of resinous material having a curved surface and for simultaneously chamfering the opposite edges thereof during one complete revolution of said disk comprising means axially supporting and rotating a milling cutter having opposed angular cutting faces at a high speed, means supporting said disk with the axis thereof parallel to the axis of said cutter for axial rotation at a relatively low speed as compared to the speed of rotation of said cutter, a form pattern associated with said supporting means, means for concomitantly rotating said disk and said form pattern to cause the edge of said disk to follow a path generated by the rotation of said form pattern, means urging the edge of said disk into engagement with said cutter to cause removal of material therefrom in conformity with the form pattern and simultaneously chamfer opposite edges of said disk concomitant with said shaping during one revolution of said disk, and means to prevent axial displacement of said disk with respect said cutters whereby the angles of chamfer form the sides of a triangle the apex ring of which lies in a plane.

FRANK P. WILLIAMS.
CHARLES V. SMITH.